United States Patent [19]
Ripoche et al.

[11] Patent Number: 5,365,365
[45] Date of Patent: Nov. 15, 1994

[54] ELECTROCHROMIC SYSTEM WITH MEASUREMENT OF CHARGE TO BE TRANSFERRED

[75] Inventors: Xavier Ripoche, Paris; Marc Ast, Fontenay-Aux-Roses, both of France

[73] Assignee: Saint Gobain Vitrage International, Courbevoie, France

[21] Appl. No.: 53,652

[22] Filed: Apr. 29, 1993

[30] Foreign Application Priority Data

Apr. 30, 1992 [FR] France .................. 9205323

[51] Int. Cl.⁵ .................. G02F 1/03; G02F 1/07
[52] U.S. Cl. .................. 359/267; 359/265; 359/275; 345/105
[58] Field of Search .............. 345/105; 359/265, 267, 359/275, 601

[56] References Cited

U.S. PATENT DOCUMENTS

| | | | |
|---|---|---|---|
| 4,242,681 | 12/1980 | Tabata . | |
| 4,529,275 | 7/1985 | Ballmer | 359/265 |
| 4,832,468 | 5/1989 | Ito | 359/275 |
| 4,896,030 | 1/1990 | Miyaji | 359/267 X |
| 5,193,029 | 3/1993 | Schofield | 359/604 |
| 5,220,317 | 6/1993 | Lynam | 345/105 |

FOREIGN PATENT DOCUMENTS

| | | |
|---|---|---|
| 2493574 | 5/1982 | France . |
| 0078463 | 5/1983 | France . |
| 3032460 | 4/1982 | Germany . |
| 3528285 | 2/1987 | Germany . |
| 61-41975 | 2/1986 | Japan . |

Primary Examiner—Eugene R. LaRoche
Assistant Examiner—Son Mai
Attorney, Agent, or Firm—Oblon, Spivak, McClelland, Maier & Neustadt

[57] ABSTRACT

An electrochromic system for controlling the color state of an electrochromic pane. The charge needed to obtain the desired color is determined from the discharge potential of the system and the coloration setpoint. An integrator measures the charge passing through the system and compares it to the charge to be transferred. This charge is measured by a differential amplifier which compares a discharge potential measured by a capacitor with a selected color set-point.

13 Claims, 3 Drawing Sheets

FIG_1

ELECTROCHROMIC SYSTEM WITH MEASUREMENT OF CHARGE TO BE TRANSFERRED

BACKGROUND OF THE INVENTION

1. Field of the Invention

This invention relates generally to an electrochromic system and, more particularly, to an electrochromic system for controlling the color of electrochromic panes.

2. Discussion of Background

An electrochromic system is a system in which a coloration state can be modified under the effect of an electric field. It is particularly applicable to control the amount of solar gain in buildings or the passenger compartments of automobiles.

A system of this type uses a film of an electrochromic material, that is to say a material capable of inserting cations such as protons or lithium ions, in a reversible manner. The oxidation states corresponding to the two states, inserted and de-inserted, have different coloration states, including in the case of panes a transparent decolored state.

For this insertion or de-insertion to take place, it is necessary to provide, alongside the film of electrochromic material, a source of cations and a source of electrons, made respectively of a film of an electrolyte having ion conductivity and of an electrically conducting film. Furthermore, the system includes a counter-electrode, which is also capable of inserting and de-inserting cations in a reversible manner, and symmetrically relative to the film of electrochromic material. This counter-electrode is, preferably, also an electrochromic material which in the case of an electrochromic pane includes two different coloration states. This counter-electrode is chosen so that the two materials shall be simultaneously decolored.

For this counter-electrode, the cation source is also the electrolyte film while the electron source is made of a second electrically conducting film. The two electrically conducting films form two electrode, across which a potential difference is applied.

This potential difference should be sufficiently high in absolute value for the insertion and de-insertion reactions of the cations in the films of electrochromic materials to take place. As a convention, we shall speak of positive voltage for a coloration and negative voltage for a decoloration. If, for example, a conduction system based upon lithium ions is chosen with tungsten oxide and nickel oxide as electrochromic material and counter-electrode respectively, coloration is thermodynamically possible only for a potential difference of greater than about 1 volt. Decoloration can be accelerated if a non-zero potential difference is applied. The reaction kinetics are then more rapid. However, this potential difference must in both cases, be less than the thermodynamic potentials of other parasitic reactions.

The values for this example at ambient temperature may be fixed at 2 volts for the insertion reaction of the protons into the tungsten trioxide and at $-1$ volt for the de-insertion.

While current is supplied to the electrochromic pane, its coloration develops as a function of time. The coloration is therefore a function of the time of passage of the electric current, that is to say the degree of coloration corresponds to the quantity of charge inserted into the electrochromic material. It is therefore possible to obtain various degrees of coloration by modulating the switching time, that is to say the amount of time that elapses during a change from one coloration state to another colored or decolored state.

Still with regard to this example, when the starting state of the electrochromic pane is known, it is only necessary to measure the charge delivered by the electrical supply circuit and, since the charge corresponding to the desired degree of coloration is known, to shut-off the supply as soon as this charge is reached. The charge can be measured by means of a current integrating circuit.

In contrast, to pass from one coloration state to another, it is necessary to store in memory the charge corresponding to this particular change and to have available a memory to contain the values of the charge quantities (or the corresponding switching times) needed to pass from any state to any other state. This is best done with the use of a microprocessor and memory map.

When the starting state for the electrochromic pane is a colored state, the situation is still more difficult, because it is necessary to take into account the quantity of charges already inserted. Now the coloration state does not necessarily correspond to the quantity of charges previously inserted, due to a phenomenon known as self-discharge of the electrochromic pane. This corresponds to a loss of charge and a return towards the decolored state. After a length of time, uncertainty exists with regard to the charge of the pane and therefore its coloration state.

It is therefore not possible to just memorize the quantity of charges that have been delivered by the electrical supply, because it is not indicative of the coloration state after a long period of time. This value cannot be taken as a starting point for a new setting, because the quantity of charges inserted will decrease.

One solution that may be envisaged for determining the starting coloration state would be to measure the light transmission and thus the degree of coloration by means of a photoelectric cell and a light source placed on either side of the pane, and preferably far from the electric supply leads.

Starting from this value of light transmission, the new setting of coloration degree is set, by generating a first voltage in the case of a coloration or a second voltage in the case of a decoloration and by modulating the switching time. This solution has the great disadvantage of requiring an extra apparatus for measuring the degree of coloration, and the necessary extra electric wiring. It should be noted that such a device may also determine when the desired light transmission is reached.

SUMMARY OF THE INVENTION

Accordingly, one object of this invention is to provide an electrochromic pane which allows the coloration to be switched to chosen values without using large and complicated supplementary equipment either to memorize the switching times or to measure the light transmission for the purpose of deducing the charge therefrom.

This problem has been solved by the present inventors after having demonstrated a close relationship between the charge state of an electrochromic pane and its discharge potential or potential of the pane at a given instant. Such a relationship was not obvious, because the potential is a function of the density of charges in the thin films. This density varies as a result of two homogenization phenomena, the one on the surface of the cell and the other within the thickness of the electrochromic materials. First, the resistance of the electrically conducting films of such a pane retards the surface homogenization of the electrochromic materials and results, during the homogenization phase, in more highly colored edges than the center of the pane. In the case of a pane of one square meter, a coloration that appears uniform to the eye is obtained after one or two minutes but, in fact, this homogenization phase is not entirely completed until after a time of the order of 3–10 minutes for transparent electrically conducting films, the square resistance of which is of the order of 5 to 10 ohms and for panes of a size smaller than 50×50 cm. Furthermore, there exists a diffusional phenomenon of the charges within the thickness of the electrochromic materials. But the present inventors have found that, for panes of ordinary dimensions, that is to say at least 10×10 cm, by far the slowest phenomenon is that linked to the resistance of the electrically conducting films, and that the phenomenon of diffusion within the thickness, which is of the order of 10 seconds, is no longer apparent well before the end of the homogenization phase at the surface. While a homogenization phase is in existence, a variation in potential is present without any variation in the charge of the pane.

In contrast, in the case of a pane of homogeneous coloration, there is a proportionality relationship between the potential of the electrochromic pane and its charge. The proportionality constant thus behaves very much like the capacitance of a capacitor. Moreover, the present inventors have also established that the value of this "capacitance" may be considered constant within a normal range of temperatures and does not vary notably when the temperature of the system changes from 20° C. to 80° C.

The capacitance value "C" being known, it therefore becomes possible to define the charge state of the electrochromic pane by a simple measurement of its potential. The initial charge state will thus be determined from the discharge potential. On the other hand, the desired coloration state or coloration set-point defined by the light transmission of the pane or coloration set-point corresponding to a given charge quantity, also corresponds to a potential which can be qualified as a set-point potential.

The difference between the set-point potential and the discharge potential multiplied by the "capacitance" of the electrochromic pane gives the charge to be transferred.

Thus, according to this invention, the problem of determining the charge of the system at a given instant and determining the charge to be applied to it in order to obtain the desired degree of coloration, is solved by determining the charge to be transferred as a function of the discharge potential measured after homogenization and of the coloration set-point. This set-point is represented in a second embodiment by a set-point potential. The term electrochromic pane is to be understood as including any type of pane having an area of at least 100 $cm^2$, for example for applications of the rear-view mirror type for automobile vehicles, and ranging up to several square meters for applications in building construction.

To obtain the desired coloration, it is possible to apply the corresponding coloration voltage. This solution is not preferred, because it is simpler, in so far as the electrical supply apparatus is concerned, to use either a coloration voltage or a decoloration voltage, so as to color or decolor the electrochromic pane as rapidly as possible. These voltages are preferably of opposite signs. They may be constant or variable with time as described, for instance, in European Patent Application 408 427. The profiles of these voltages may depend upon the temperature.

According to this invention, the supply to the electrochromic system is made according to either a coloration potential profile or a decoloration potential profile. As indicated earlier, the discharge voltage is correctly indicative of the charge to the system only after a homogenization period. It is therefore advantageous to prohibit measurement of the discharge voltage during the coloration time or decoloration time plus the homogenization time. In order to enable, nevertheless, the coloration set-point to be modified before the end of this homogenization, it is always advantageous to keep in memory the discharge voltage during supply so as to retain it as a starting reference. This may be achieved by using a capacitor having a high leakage resistance, for example of $10^{12}$ ohms, which is readily available on the market. This analogue type of storage eliminates the need for using a microprocessor. This storage of the discharge potential is advantageously carried out before the electrochromic system is supplied with current. As a result of this storage, if the coloration set-point is modified before homogenization of the pane, it will be possible for the transfer of charges to be continued on the basis of the new calculated value taking into account, the charges already transferred, which implies a non-restart of the charge-counter. Such a measurement is possible because over a period of time as short as the homogenization time, the self-discharge phenomenon is entirely negligible.

It is also possible, to compensate for the self-discharge phenomenon of the electrochromic pane, by recoloring it to the desired coloration set point.

To do this, in one embodiment of this invention, after a time which experimentally corresponds to a certain self-discharge threshold, the coloration is automatically triggered, thus maintaining an almost constant coloration.

The method according to this invention allows a set-point for a degree of coloration to be achieved whatever the starting state of the electrochromic pane and the set-point coloration to be maintained in time.

This method has the advantage of being simple to carry out by means of analogue circuits. It is not necessary to use a microprocessor map.

The apparatus of the present invention includes a generator capable of supplying a coloration or decoloration voltage, an integrator measuring the charge passing through the electrochromic system and comparing it, by means of a comparator, with the charge to be transferred which is calculated by a differential amplifier operating from the value of the set-point potential imposed, for example, by a selector, and of the discharge potential measured by a capacitor.

As indicated earlier, the capacitor may also serve for storing the discharge potential.

The supply circuit includes a selector switch for choosing between a first voltage for coloration and a second voltage for decoloration. This supply circuit is designed in such a way that the on-off switch which connects the capacitor to store the discharge potential is closed and then opened before the on-off switch which supplies the electrochromic system with current closes. An electronic component such as a flip-flop (bistable circuit) may, for example control these two on-off switches. A flip-flop or bistable circuit is an element having two inputs and one output. Pulses arriving through one or the other of the inputs corresponding either to an initialization or to a resetting to zero are translated, respectively, into logic states "1" and "0" which appear at the output.

One possible improvement to the apparatus is to include a means blocking the measurement of the discharge potential during the coloration or decoloration period plus the homogenization time. This total time is less than 15 minutes for a pane of 50×50 cm with a square resistance of the electrically conducting films of 5 to 10 ohms.

A second improvement to the apparatus is to include a means which automatically triggers the coloration of the electrochromic system when this system passes through a self-discharge threshold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
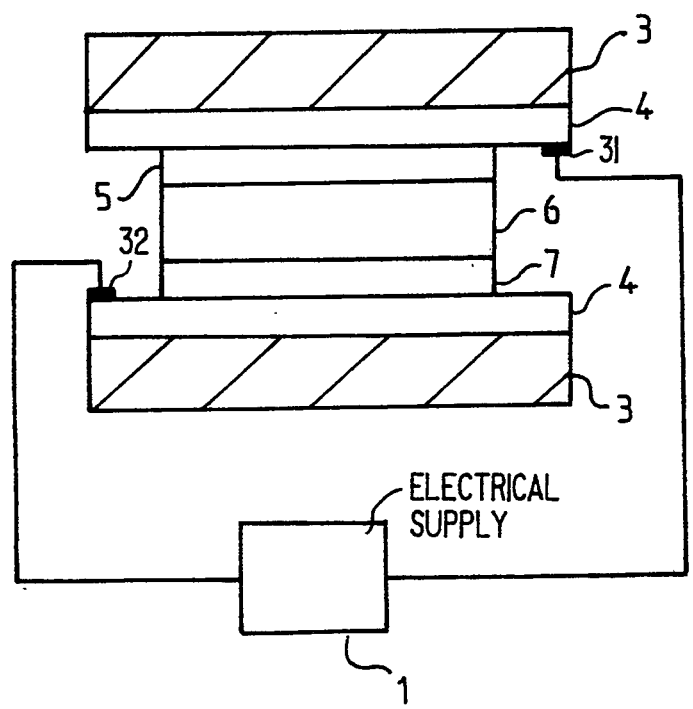
FIG. 1 is a diagram of an electrochromic pane according to the present invention.

Referring now to the drawings, wherein like reference numerals designate identical or corresponding parts throughout the several views, and more particularly to FIG. 1 thereof, wherein: FIG. 1 describes the connection of an electrical supply control apparatus 1 to an electrochromic pane 2.

The electrochromic pane is composed, between the two glass sheets 3, of two electrically conducting films 4, between which are situated the electrochromic material 5, notably a layer of tungsten oxide, an electrolyte 6 and a counter-electrode 7 which may also be an electrochromic material.

Figure 2:
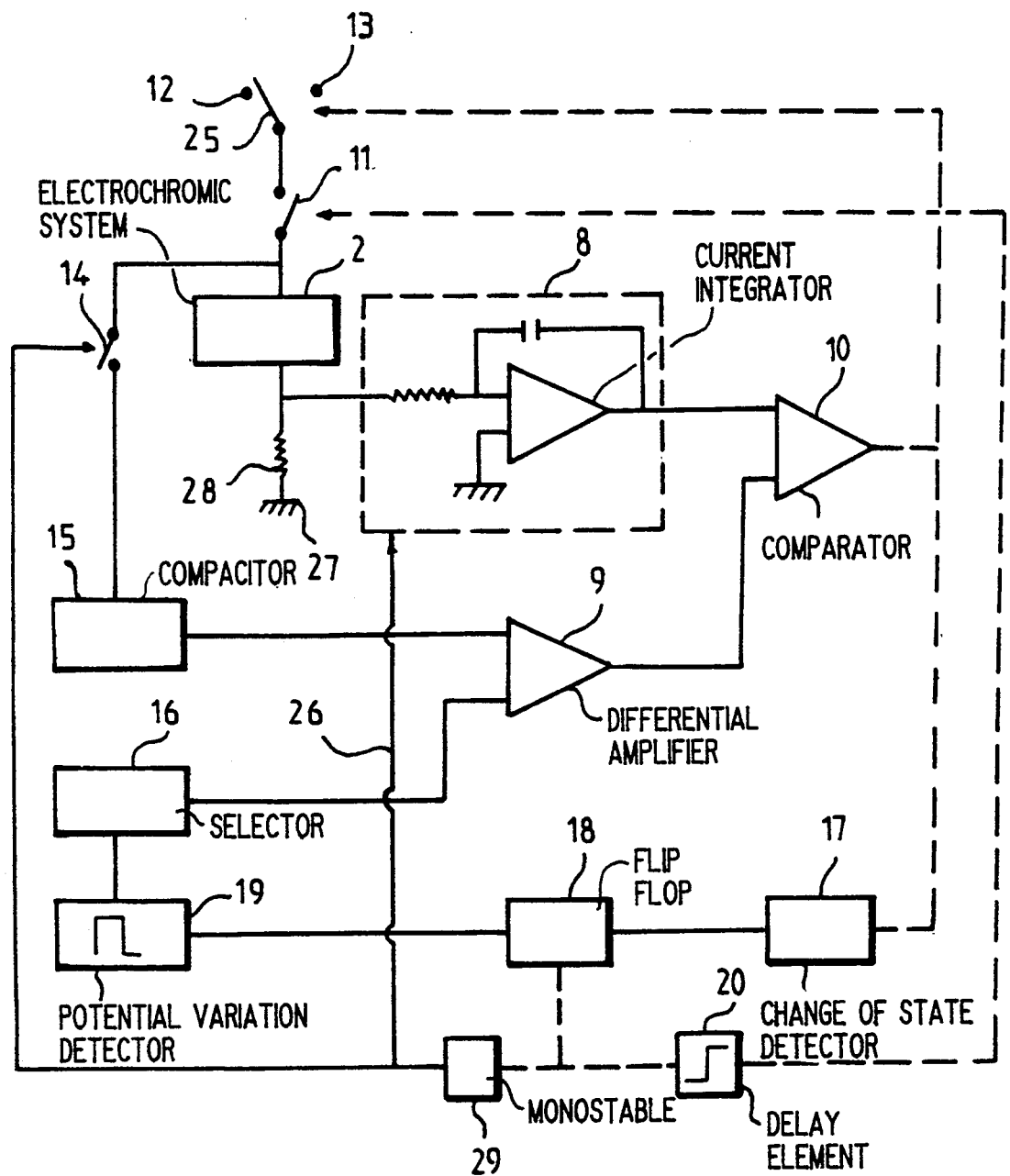
FIG. 2 is a block diagram of a first embodiment of the present invention.

A potential difference is made between two electric contacts 31 and 32, one of which is on one of the electrically conducting films and the other of which is, on the second electrically conducting film, diagonally opposite to the first, The electric supply device is described in FIG. 2, where lines corresponding to control signals have been shown in full line and lines corresponding to logic states are broken lines. This supply includes a current integrator 8, a differential amplifier 9, a comparator 10, a generator capable of supplying a coloration voltage 12 or decoloration voltage 13, a capacitor 15, a selector 16, a change-of-state detector 17 and a flip-flop 18.

This apparatus enables an electrochromic pane 2, connected to ground 27, to be supplied with current, and the charge passing through it to be measured by means of the current integrator 8 and measuring resistor 28.

Furthermore, the differential amplifier 9 determines, from the set-point potential and the discharge potential, the charge to be passed through the electrochromic pane 2.

The analogue comparator 10, then determines whether to color or to decolor the electrochromic pane 2 and at what instant the set-point value is reached.

The electrochromic pane 2 may be supplied, when the on-off switch 11 is in the closed position, with the coloration voltage 12 or the decoloration voltage 13, depending upon the position of the switch 25. During the supply, the charge passing through the electrochromic pane is measured by means of the current integrator 8.

The following further describes the function of the device of FIG. 2 when switching has been initiated a long time after the last switching, and therefore in the case of homogeneous initial coloration.

The operator selects a set-point voltage corresponding to the desired color by means of selector 16, which is for example a multiposition switch or cursor type. It will be evident that the selector switch will include graduations corresponding to different levels of coloration, even if the signal at the output from the selector 16 is always at a set-point voltage value.

This action on the selector 16 has the immediate effect of closing the contact breaker 14, via the potential variation detector 19 and the flip-flop 18, the functions of which will be discussed later. Simultaneously, the integrator 8 is reset to zero by line 26. With a slight delay due to the delay element 20, for example of the monostable circuit type, the on-off switch 11 is closed, thus effectively supplying the electrochromic system 2 with current.

During this delay, the electrochromic system is thus connected to the capacitor 15, so that the potential of the capacitor 15 corresponds to the potential of the pane at this instant, and therefore to the discharge potential. For the discharge of the pane to be virtually negligible, it is essential for the capacitance of the capacitor 15 itself to be very small, which is the case in practice because the capacitance of an electrochromic pane is greater than 5 mf/cm$^2$. Furthermore, if the leakage resistance of this capacitor is very large, the potential across its terminals will remain virtually constant for a fairly long period, which corresponds well to a temporary storage of the capacitor. As an example, a capacitor having a capacitance of 0.1 $\mu$F and a leakage resistance of $10^{12}$ ohms can be used.

This measurement of the discharge potential is carried out only during this delay time. To achieve this, the switch 14 may be controlled by a monostable circuit 29, the pulse duration of which is shorter than the delay time. In this way the contact breaker 14 is closed and then opened before closure of the on-off switch 11.

Still during this first phase which precedes the closure of the switch 11, the charge to be transferred and its sign, indicating a coloration or a decoloration, are determined by means of the differential amplifier 9, the current integrator 8 and the comparator 10.

The differential amplifier 9 preferably has a high input impedance, for example $10^{12}$ ohms, so as not to discharge the capacitor 15, and a gain preferably identical to the capacitance of the electrochromic pane, so that it supplies at its output a signal equal to C (Uc-Ua), where Uc is the set-point potential supplied by the selector 16, Ua the discharge potential measured by the capacitor 15, and C the capacitance of the pane. In other words, the signal is directly equal to the charge to be transferred.

Since current integrator 8 has been reset to zero by the monostable circuit 29, the comparator 10 will determine the "sign" of the charge and the switch will close onto one or the other of positions 12 and 13. The delay generated by the delay element 20 is such that it is only when the changeover switch 25 is triggered that the on-off switch 11 is closed.

The effective coloration or decoloration phase now starts. During this phase, the current integrator 8 measures the charge which passes through the electrochromic pane 2. At any instant during this phase, the comparator 10 compares this value with the charge to be transferred $C(U_c-U_a)$.

The comparator 10 can adopt two logic states "0" and "1" as a function of the difference in potential between its two inputs. When the quantity of charge measured by the integrator is equal to the charge to be transferred, $C(U_c-U_a)$, the comparator 10 changes state and modifies the position of the changeover switch 25. This situation corresponds to the instant at which the set-point voltage is reached.

The comparator 10, through the intermediary of a change-of-state detector 17, the flip-flop 18 and the delay element 20, has the effect of re-opening the on-off switch 11. The supply of current to the electrochromic pane 2 is then suspended.

The change-of-state detector 17 complements the comparator 10. The latter, having only two logic states which are used for the coloration and decoloration states, is not itself able to stop the supply of current to the electrochromic pane. The change-of-state detector 17 makes it possible, when the current integrator 8 has reached the set-point charge and the comparator 10 passes from one state to the other, for this information to be transmitted to the flip-flop 18, which changes to the state corresponding to the open position of the switch 11.

Furthermore, as we have seen earlier, the flip-flop 18 changes to the state corresponding to the closed position of the switch 11 and thus to the energizing of the electrochromic pane 2 by means of a potential variation detector 19 according to the action of the selector switch 16.

The potential variation detector 19 may, for example, be either a logic differentiator circuit which detects a rate of variation of potential, or a differential amplifier which detects a variation in potential by means of the old set-point potential previously stored. In both cases, this triggers a monostable circuit, the signal of which places the flip-flop 18 in the state corresponding to the supply.

The monostable circuit of the potential variation detector 19 advantageously emits a signal after a delay period, so that the possible change of state of the comparator 10 when it determines whether a coloration or a decoloration is involved, or indeed when the set-point is modified before the desired charge is reached, which can invert the state of the comparator 10, does not perturb the coloration or decoloration operation.

Figure 3:
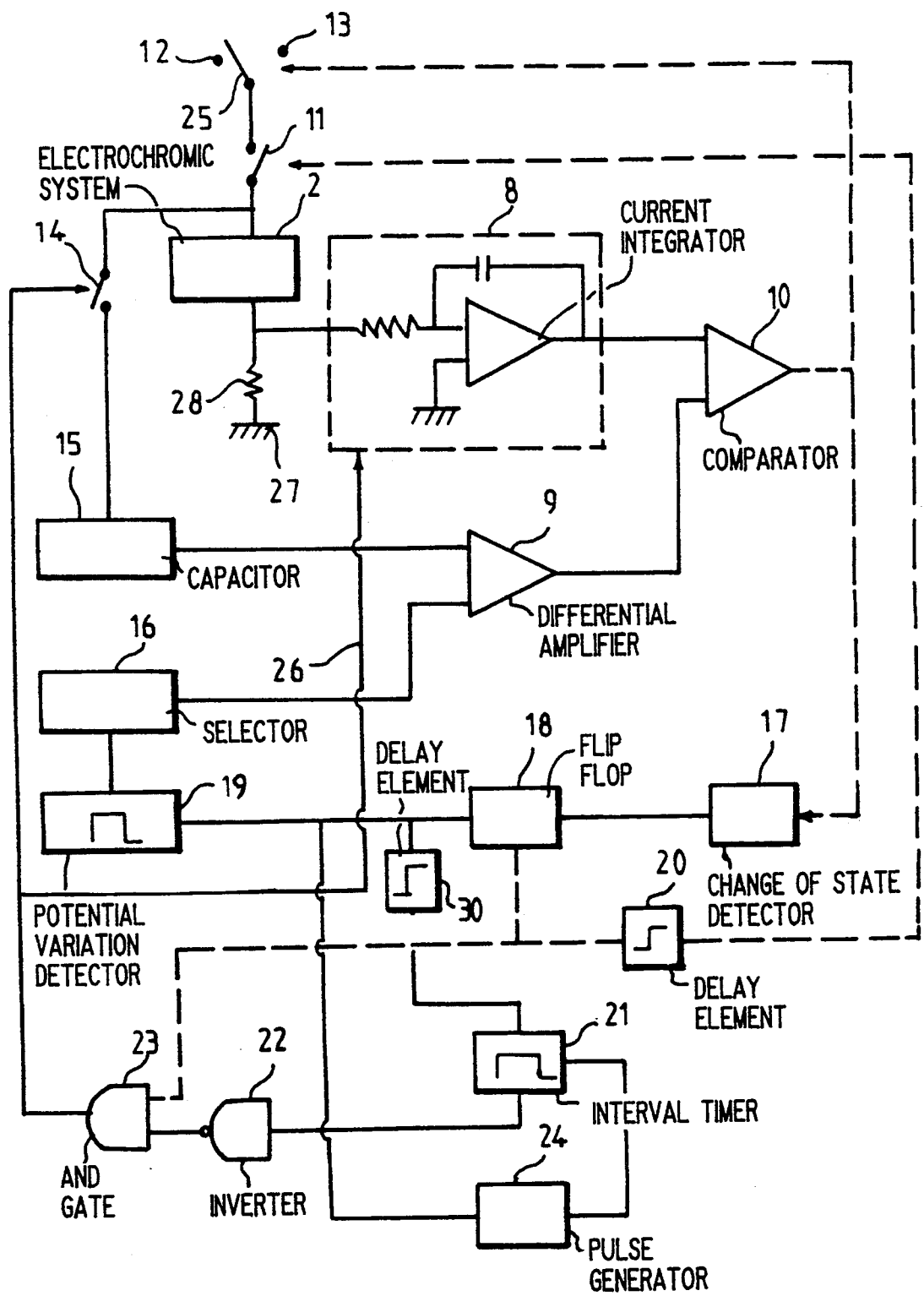
FIG. 3 is a block diagram of a second embodiment of the present invention.

The supply circuit shown in FIG. 3 describes a second embodiment of the apparatus according to this invention. A certain time must elapse before the electrochromic pane becomes homogenized to the desired degree of coloration. During this time, the discharge potential is not representative of the desired coloration but only of that of the edges of the pane, which are more tinted than the center.

If the operator should decide to modify his set-point during this interval of time, the adjustment would not be that desired because the discharge potential measured will not be correct. To overcome this, it is possible to couple the selector switch 16 to a device, not shown in the figures, enabling the selector 16 to be blocked during the period of coloration change and the homogenization phase.

It may be more advantageous to modify the circuit and to allow the discharge potential to be measured only when the electrochromic pane is homogenized. Consequently, to permit an adjustment that is to say to propose a new value of the set-point potential during the homogenization phase the discharge potential already stored is used, without resetting the integrator 8.

This is achieved, for instance, in the circuit of FIG. 3, which is identical to the circuit of FIG. 2 for all elements which carry the same reference numbers. To these have been added an interval timer which may, for example, be a monostable circuit 21 which blocks the instruction from the flip-flop with regard to the closing of the switch 14 and resetting of the integrator 8, until the end of homogenization.

This interval timer 21 is, for example, triggered by the signal from the potential variation detector 19 after a delay to permit storage of the discharge potential if the coloration is homogeneous at the instant of the new setting. To do this, a delay element 30 is added. The interval timer then emits, after a delay, a signal during the time corresponding at least to the coloration or decoloration desired plus the homogenization time.

This signal may be inverted by an inverter 22. An AND gate compares this signal with the state of the flip-flop. When neither the coloration nor the decoloration nor the homogenization phase is operative, the AND gate 23 supplies a signal and closes the switch 14, which then stores the discharge potential, and the integrator 8 is reset.

In the contrary case, the output of the AND gate 23 remains at state "0". The switch 14 does not close and the integrator 8 is not reset. The process then consists of comparing, by means of the comparator 10, the new set-point charge and the charge passing through the electrochromic pane, taking into account the charge that has already passed through before the new set-point, because the integrator 8 in not reset.

In a first period, the comparator may be caused to act upon the switch 25 if the system is passing from a coloration state to a decoloration state or vice versa. Such a method, making possible the application of a new set-point potential to the electrochromic pane, notably during the homogenization phase, gives good results because the self-discharge phenomenon is negligible during this period.

On the other hand, if a longer scale of time is considered, in which the self-discharge phenomenon can become a problem, it is advantageous to arrange for the process to self-trigger when the decoloration becomes noticeable to the eye, for example, in order to reinstate the desired coloration.

To achieve this, the device may be improved with a supplementary element enabling a recoloration of the electrochromic pane to the desired coloration to be caused.

For example, a pulse generator 24 may be used, which at the end of a given time, corresponding for instance to the decoloration that can be detected by the eye, emits a pulse to the flip-flop 18, which triggers the process. The pulse generator 24 is controlled by the interval timer 21 in such a way that the pulse generator 24 triggers at the end of the signal emitted by the interval timer 21. When the pulse generator 24 triggers, the pulse is not emitted until after a given time, corresponding to the decoloration that can be detected by the eye, for example.

The method and the apparatus according to this invention therefore make it possible, in the form of analog circuits, to pass from a coloration state of an electrochromic pane to another desired state. They also allow the electrochromic pane to be maintained in the desired coloration state.

Earlier techniques made this operation possible only with the assistance of a costly system, which was difficult to install and enabling the charge state of the electrochromic pane to be defined, and of a microprocessor. The invention therefore eliminates the need for costly and bulky elements which require an installation that frequently is difficult.

Obviously, numerous (additional) modifications and variations of the present invention are possible in light of the above teachings. It is therefore to be understood that within the scope of the appended claims, the invention may be practiced otherwise than as specifically described herein.

We claim:

1. A method of controlling the color in an electrochromic system, comprising the steps of:
    determining the charge to be transferred as a function of the discharge potential of the system;
    measuring the charge passing through the systems;
    comparing the measured charge with the charge to be transferred; and
    controlling the supply of current to said electrochromic system in response to said comparing.

2. A method according to claim 1, wherein said determining step includes comparing the discharge potential with a selected set-point.

3. A method according to claim 1, wherein said electrochromic system is controlled according to a coloration potential profile.

4. A method according to claim 1, wherein the charge to be transferred is determined by storing the discharge potential of the system after homogenization of the system.

5. A method according to claim 4, wherein the discharge potential is stored before current is supplied to the electrochromic system.

6. A method according to claim 1, wherein the discharge potential is not measured during a time period corresponding to the coloration time plus homogenization time.

7. A method according to claim 6, further comprising the step of automatically triggering coloration after a time corresponding to a self-discharge threshold.

8. An apparatus for controlling the color of an electrochromic system, comprising:
    a generator selectively supplying one of two coloration voltages to said electrochromic system;
    an integrator for measuring a charge passing through said electrochromic system;
    a capacitor for measuring the discharge potential of said system;
    a differential amplifier for calculating the charge to be transferred from the measured discharge potential and a selected set-point; and
    a comparator for comparing the measured charge with the charge to be transferred and controlling the supplied voltage in response thereto.

9. An apparatus according to claim 8, wherein the capacitor has a high leakage resistance for storing the discharge potential.

10. An apparatus according to claim 8, further comprising a delay element connected to said comparator for delaying the supply of voltage from the generator to the electrochromic system so that the capacitor measures the discharge potential before the application of the voltage.

11. An apparatus according to claim 10, further comprising a bistabe device connected between said comparator and said delay element.

12. An apparatus according to claim 8, further comprising means for blocking the measurement of the discharge potential during a time equal to the coloration time plus the homogenization time.

13. An apparatus according to claim 8, further comprising means for automatically triggering the coloration of the electrochromic system after a time corresponding to a self-discharge threshold.

* * * * *